US012429071B2

(12) United States Patent
Nakajima et al.

(10) Patent No.: US 12,429,071 B2
(45) Date of Patent: Sep. 30, 2025

(54) PILOT PRESSURE CONTROL DEVICE

(71) Applicant: Caterpillar SARL, Geneva (CH)

(72) Inventors: Hideki Nakajima, Akashi (JP); Toshikazu Koga, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 18/684,775

(22) PCT Filed: Sep. 1, 2022

(86) PCT No.: PCT/EP2022/025409
§ 371 (c)(1),
(2) Date: Feb. 19, 2024

(87) PCT Pub. No.: WO2023/036463
PCT Pub. Date: Mar. 16, 2023

(65) Prior Publication Data
US 2025/0027516 A1 Jan. 23, 2025

(30) Foreign Application Priority Data
Sep. 7, 2021 (JP) ................................ 2021-145466

(51) Int. Cl.
*F15B 13/042* (2006.01)
*E02F 9/22* (2006.01)
*F15B 11/16* (2006.01)

(52) U.S. Cl.
CPC ........ *F15B 13/0426* (2013.01); *E02F 9/2235* (2013.01); *E02F 9/226* (2013.01);
(Continued)

(58) Field of Classification Search
CPC ............ F15B 13/0426; F15B 2211/355; F15B 2211/6653; F15B 2211/30525;
(Continued)

(56) References Cited

U.S. PATENT DOCUMENTS 4,523,430 A * 6/1985 Masuda .................. B29C 45/82 60/420
5,005,466 A * 4/1991 Miyaoka ............... E02F 9/2203 91/461
5,537,819 A * 7/1996 Kobayashi .............. F15B 11/04 60/459
5,611,259 A * 3/1997 Nagata .................. B30B 15/161 91/437
6,327,956 B1 * 12/2001 Rink ..................... F15B 11/024 91/437
10,648,488 B1 * 5/2020 Zähe ..................... F15B 11/042
2014/0060031 A1 * 3/2014 Cesur ...................... F15B 1/024 91/392
(Continued)

FOREIGN PATENT DOCUMENTS

CN 110499799 A 11/2019
JP H05187409 A 7/1993
(Continued)

OTHER PUBLICATIONS

International Search Report related to Application No. PCT/EP2022/025409; reported on Jan. 9, 2023.

*Primary Examiner* — Minh Q Le

(57) ABSTRACT

To provide a pilot pressure control device capable of securing a pilot pressure with an inexpensive configuration. There is equipped with a controller configured, when a pump pressure drops to a predetermined pressure or below resulting from the drive of a fluid pressure actuator, to control so as to throttle an opening of a spool that is the cause of the drop in the pump pressure. The pump pressure can be maintained with an inexpensive configuration without increasing the size of an accumulator for pressure accumulation, and the pilot pressure can be secured by the pilot circuit from this pump pressure.

4 Claims, 4 Drawing Sheets

(52) U.S. Cl.
CPC ........... *E02F 9/2285* (2013.01); *E02F 9/2296* (2013.01); *F15B 11/16* (2013.01); *F15B 2211/30525* (2013.01); *F15B 2211/329* (2013.01); *F15B 2211/355* (2013.01); *F15B 2211/625* (2013.01); *F15B 2211/6313* (2013.01); *F15B 2211/6355* (2013.01); *F15B 2211/665* (2013.01); *F15B 2211/6653* (2013.01); *F15B 2211/71* (2013.01)

(58) Field of Classification Search
CPC .......... F15B 2211/329; F15B 2211/625; F15B 2211/6313; F15B 2211/6355; F15B 2211/665; F15B 2211/71; F15B 11/16; E02F 9/2235; E02F 9/2285; E02F 9/2296; E02F 9/226
USPC .......................................... 251/29; 137/487.5
See application file for complete search history.

(56) References Cited

U.S. PATENT DOCUMENTS

| | | | | |
|---|---|---|---|---|
| 2016/0333899 | A1* | 11/2016 | Kondo | F15B 11/044 |
| 2018/0142709 | A1* | 5/2018 | Kondo | F15B 11/10 |
| 2019/0186105 | A1* | 6/2019 | Imura | E02F 9/22 |
| 2019/0234050 | A1* | 8/2019 | Kim | E02F 9/2235 |
| 2020/0032485 | A1* | 1/2020 | Hijikata | E02F 9/2267 |
| 2022/0112688 | A1* | 4/2022 | Nakajima | E02F 9/2289 |
| 2023/0167628 | A1* | 6/2023 | Nakajima | E02F 9/2285 60/468 |
| 2024/0301661 | A1* | 9/2024 | Amano | F15B 20/00 |

FOREIGN PATENT DOCUMENTS

| | | | |
|---|---|---|---|
| JP | H07190006 | A | 7/1995 |
| JP | 2001020903 | A | 1/2001 |
| JP | 2006308073 | A | 11/2006 |
| JP | 6574066 | B2 | 9/2019 |

* cited by examiner

PILOT PRESSURE CONTROL DEVICE

CROSS-REFERENCE TO RELATED APPLICATION

This Application is a 35 USC § 371 US National Stage filing of International Application No. PCT/EP2022/025409 filed on Sep. 1, 2022 which claims priority under the Paris Convention to Japanese Patent Application No. 2021-145466 filed on Sep. 7, 2021.

FIELD OF THE INVENTION

The present invention relates to a pilot pressure control device configured to control a pilot pressure of a fluid pressure circuit.

BACKGROUND OF THE INVENTION

Conventionally, there is a hydraulic circuit configured to generate a pilot pressure without the need for a pilot pump, by reducing a portion of the oil discharged from a main pump to a set pressure by a pressure-reducing valve.

In such a configuration, there is a concern that the required pilot pressure cannot be maintained, if the pressure of the oil discharged from the main pump drops.

Thus, such a device is known that, by disposing an accumulator, even if the pressure of the main pump has dropped below a required pilot pressure, the required pilot pressure can be maintained by the pressure stored in the accumulator only a brief time (see, for example, Patent Literature 1).

PRIOR ART DOCUMENT

Patent Document

PATENT DOCUMENT 1: Japanese Patent Application Laid-Open No. 2001-20903

SUMMARY OF THE INVENTION

Problems to be Solved by the Invention

However, in the case of the above-described configuration, it is necessary to increase the size of the accumulator in order to lengthen the holding time of the pilot pressure. Increasing the size of the accumulator leads to increase in the size and cost of a system.

The present invention has been made in view of the above circumstances. It is an object of the present invention to provide a pilot pressure control device capable of securing a pilot pressure with an inexpensive configuration.

Means for Solving the Problems

The invention described in claim 1 is a pilot pressure control device configured to control a pilot pressure of a fluid pressure circuit comprising a main circuit configured to control working fluid discharged from a pump by a control valve to drive a fluid pressure actuator; and a pilot circuit configure to supply a pressure which has been controlled so as to depressurize a portion of the working fluid discharged from the pump as a pilot pressure source, the pilot pressure control device comprising a controller configured, when a pump pressure drops to a predetermined pressure or below resulting from the drive of the fluid pressure actuator, to control so as to throttle an opening of a spool that causes the decrease in the pump pressure.

An invention described in claim 2 is the pilot pressure control device according to claim 1, wherein the controller controls, when a state where the pump pressure is kept at the predetermined pressure or below has continued for a predetermined time length or longer resulting from the drive of the fluid pressure actuator, so as to throttle the opening of the spool that causes the decrease in the pump pressure.

An invention described in claim 3 is the pilot pressure control device according to claim 1 or 2, further comprising a pressure sensor configured to detect a fluid pressure of the fluid pressure actuator, wherein the controller is configured to specify the spool that is causing the pump pressure drop, on the basis of the pressure detected by the pressure sensor.

Favorable Effects of the Invention

According to the invention of claim 1, the pump pressure can be maintained in an unexpensive configuration without increasing the size of an accumulator for pressure accumulation, and the pilot pressure can be secured by a pilot circuit from this pump pressure.

According to the invention of claim 2, controller can be prevented from frequently throttling the opening of the spool in response to a momentary change in pump pressure.

According to the invention of claim 3, it becomes possible to control accurately the pump pressure and the pilot pressure.

BRIEF DESCRIPTION OF THE DRAWINGS

FIG. 4 (*b*) is a graph illustrating an example of lever operation that causes the pressure change of FIG. 4 (*a*).

DETAILED DESCRIPTION OF THE INVENTION

Hereinbelow, the present invention will be described in detail on the basis of an embodiment illustrated in FIGS. 1 to 3.

Figure 1:
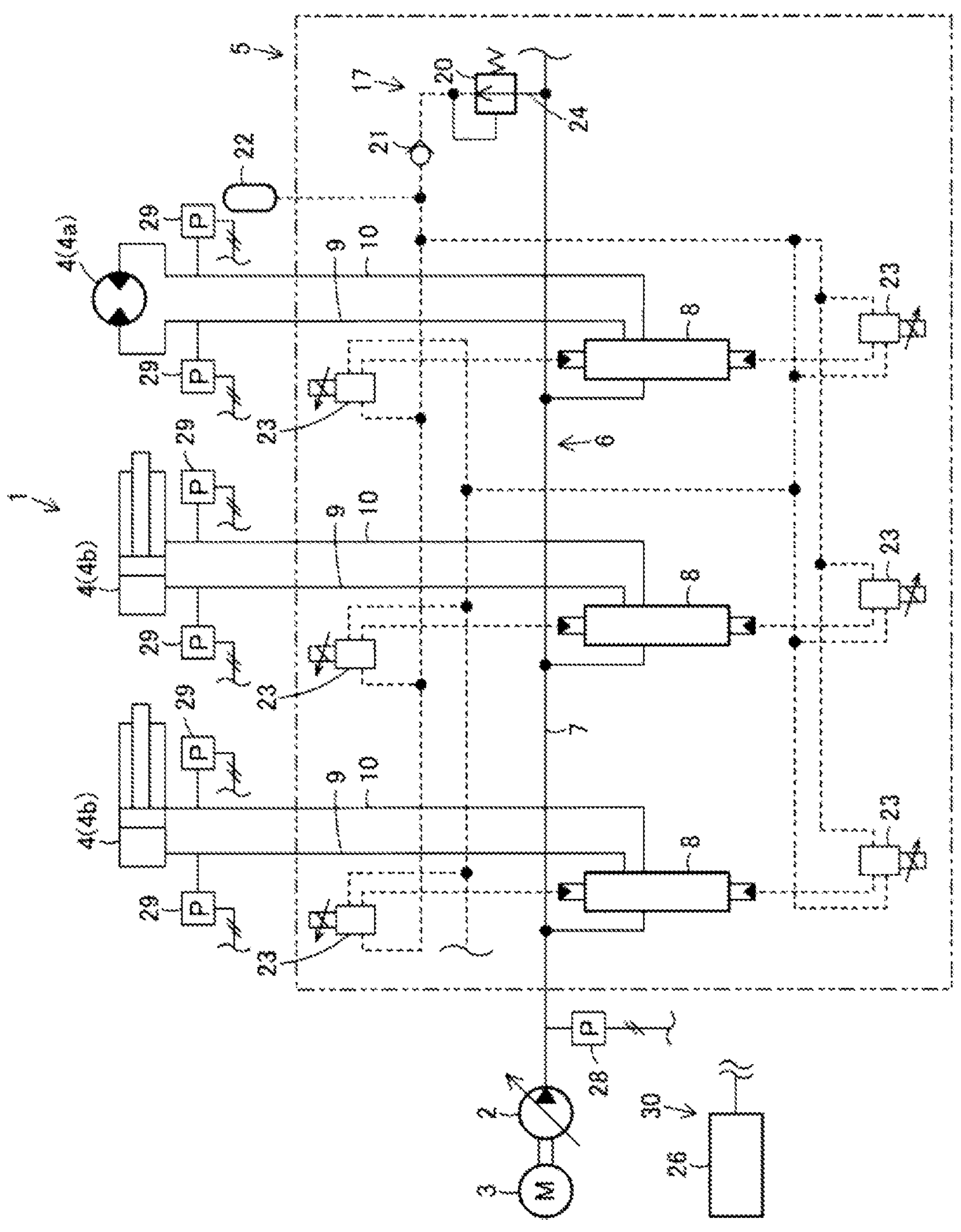
FIG. 1 is a circuit diagram illustrating an embodiment of a pilot pressure control device according to the present invention.

In FIG. 1, reference numeral 1 denotes a fluid pressure circuit. The fluid pressure circuit 1 includes a pump 2. The pump 2 is a main pump that is operated by a prime mover 3 such as an engine or a motor and supplies working fluid to the fluid pressure circuit 1. That is, the pump 2 converts mechanical power into fluid pressure power. The fluid pressure power converted by the pump 2 is converted into mechanical power by a fluid pressure actuator 4. Any number any type of the fluid pressure actuators 4 may be used. In FIG. 1, the fluid pressure actuators 4 are illustrated taking a fluid pressure motor **4*a* and fluid pressure cylinders 4*b* as examples. Further, the working fluid supplied into the fluid pressure circuit 1 by the pump 2 is stored in a tank (not illustrated). The tank receives a return fluid of the fluid pressure circuit 1**.

Then, the fluid pressure circuit 1 includes a main circuit 6 configured to operate the fluid pressure actuator 4 to obtain power, by controlling flow rate and direction of the working fluid that is discharged from the pump 2 operated by the prime mover 3 and supplied to the fluid pressure actuator 4, by a control valve 5 in accordance with the operation of an operation body such as a lever or a pedal by an operator.

The control valve 5 includes a pump line 7 which is a discharge line of the pump 2. The pump 2 is connected to a tank via the pump line 7. A plurality of spools 8 corresponding to the number of the fluid pressure actuators 4 are disposed in the pump line 7. The spool 8 and the fluid pressure actuator 4 are connected by paired connection passages 9, 10, and the direction and flow rate of the working fluid supplied to the fluid pressure actuator 4 are controlled in accordance with a displacement direction and a displacement amount of the spool 8.

The spool 8 is operated such that its displacement direction and displacement amount, i.e., opening amount (valve opening) corresponds to a pilot pressure supplied in response to the operation of the operation body by the operator. This pilot pressure is supplied from a pilot circuit 17. The pilot circuit 17 is branched from the pump line 7 and supplies a portion of the working fluid discharged from the pump 2 operated by the prime mover 3 after having been subjected to pressure-reducing control. As an example, the pilot circuit 17 include a pressure-reducing valve 20 that lowers the pressure of the working oil discharged from the pump 2 to generate a pilot primary pressure, a check valve 21 for holding the pilot primary pressure, an accumulator 22 for smoothing the pilot primary pressure, and electromagnetic valves (electromagnetic proportional valve) 23 for controlling a pilot pressure (pilot secondary pressure) acting on the spool 8. The pressure-reducing valve 20, the check valve 21, and the accumulator 22 are sequentially disposed on a pilot line 24 branched from the pump line 7, and the pilot line 24 is branched to the electromagnetic valves 23 disposed respectively on one end side and the other end side of each spool 8. That is, it is configured such that the working oil discharged from the pump 2 is reduced in pressure by the pressure-reducing valve 20 and is distributed and supplied to each of the electromagnetic valves 23 that controls the stroke of each of the spools 8.

The pilot pressure set by the pilot circuit 17 is set via a controller (ECM) 26. The controller 26 is electrically connected to the solenoid of the electromagnetic valve 23. A control signal being an electric signal is output from the controller 26 to the solenoid of the electromagnetic valve 23 in response to the operator's operation or the like, and the amount of displacement of the spool 8 is controlled so as to be increased or decreased according to an increase or decrease in an energization amount (current) of the solenoid of the electromagnetic valve 23 in accordance with this control signal.

Figure 2:
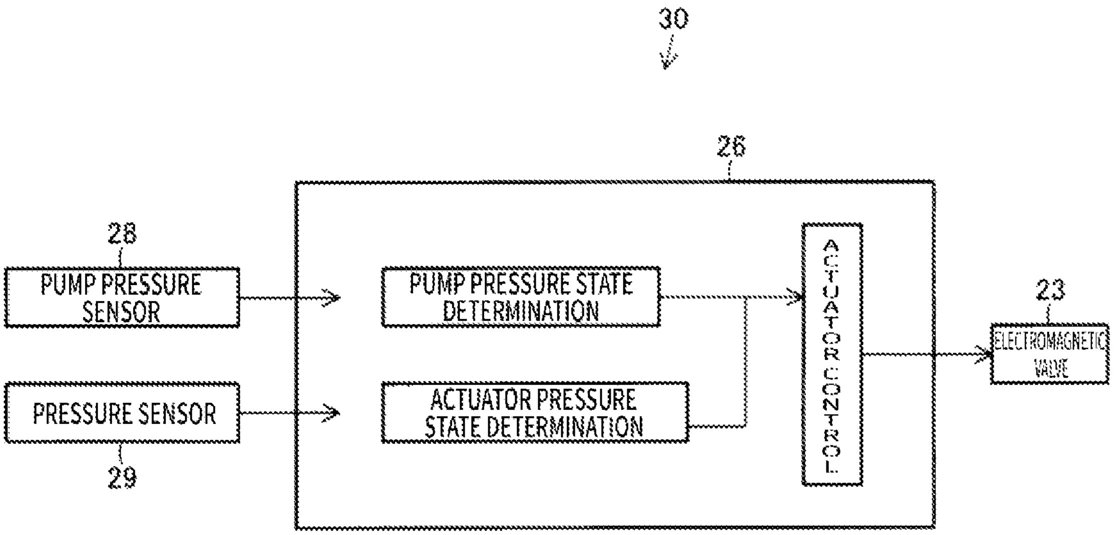
FIG. 2 is a control block diagram of the pilot pressure control device same as above.

As illustrated in FIGS. 1 and 2, the controller 26 is electrically connected to a pump pressure sensor 28 for detecting the pump pressure, and pressure sensors 29 for detecting the fluid pressure of the fluid pressure actuator 4, respectively.

The pressure sensors 29 detects respective load pressures of a fluid pressure motor 4*a* when rotating in one direction and in the other direction (when rotating in forward direction and reverse direction), as well as rod pressure and head pressure of a fluid pressure cylinder 4*b*.

Then, when the pump pressure drops to a predetermined pressure or below resulting from the drive of the fluid pressure actuator 4, the controller 26 controls the electromagnetic valve 23 so as to throttle the opening of the spool 8 which is the cause of the drop in the pump pressure. The pilot pressure control device 30 is composed of the controller 26, the pump pressure sensor 28, the pressure sensors 29, and the electromagnetic valves 23.

In the present embodiment, the fluid pressure circuit 1 is a hydraulic circuit used for working machines, for example such as hydraulic excavators. In this case, the fluid pressure actuators 4 includes the fluid pressure motor 4*a* used for traveling, revolving of the working machine, and the fluid pressure cylinders 4*b* used for operating a working implement constituted of a boom, an arm (stick), a bucket, and the like.

Next, the control of the pilot pressure according to the illustrated embodiment will be described in detail with reference to the control block diagram illustrated in FIG. 2 and the flowchart illustrated in FIG. 3.

As a schematic, the controller 26 is configured to monitor pump pressures and actuator pressures by the pump pressure sensor 28 and the pressure sensors 29, respectively, and when a pump pressure drops to a required pilot pressure or below resulting from the drive of the fluid pressure actuator 4, to specify a spool 8 that controls the direction and flow rate of the working fluid to the fluid pressure actuator 4 which is a cause or a main cause of the decrease in the pump pressure, to generate a control signal for throttling the opening of the spool 8 to output the control signal to the solenoid of the electromagnetic valve 23 corresponding to the spool 8, thereby suppressing the decrease in the pump pressure and securing the pilot pressure.

More precisely, first, as illustrated in FIG. 2, the controller 26 confirms a pump pressure on the basis of the output of the pump pressure sensor 28 and determines a pump pressure state.

Figure 3:
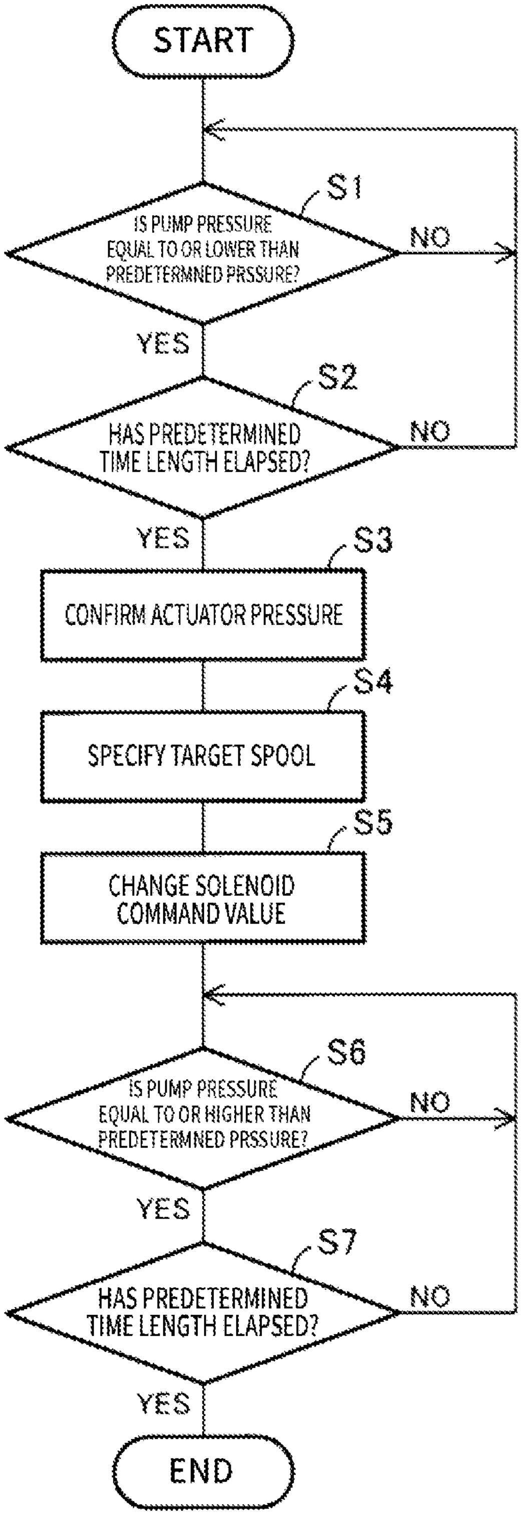
FIG. 3 is a flowchart illustrating a control method by the pilot pressure control device same as above.

Specifically, in Step S1 illustrated in FIG. 3, the controller 26 determines whether the pump pressure is equal to or lower than a preset predetermined pressure. The predetermined pressure is a preset required pilot pressure, for example, 4 MPa or the like. In Step S1, if it is determined that the pump pressure is equal to or lower than the preset predetermined pressure (YES in the flowchart), then in Step S2, the controller 26 determines whether a preset predetermined time length has elapsed. The predetermined time length is preset on the basis of the discharge time length of the accumulator 22. In Step S2, if it is determined that the predetermined time length has elapsed (YES in the flowchart), that is, if it is determined that a state where the pump pressure is equal to or lower than the predetermined pressure has continued for the predetermined time length or longer, then the process proceeds to Step S3. On the other hand, in Step S1, if it is determined that the pump pressure is not equal to or lower than the predetermined pressure (NO in the flowchart), and in Step S2, if it is determined that the predetermined time length has not elapsed (NO in the flowchart), then the process returns to Step S1 respectively.

Next, as illustrated in FIG. 2, the controller 26 confirms fluid pressures (load pressures), i.e., actuator pressures of the fluid pressure actuators 4, on the basis of the outputs of the pressure sensors 29 and determines an actuator pressure state. Specifically, in Step S3 illustrated in FIG. 3, the controller 26 detects respectively fluid pressures (load pressures) of respective fluid pressure actuators 4 from the outputs of the pressure sensors 29 and determines whether the respective fluid pressures are equal to or lower than predetermined threshold pressures that have been preset with respect to the respectively fluid pressures.

Then, as illustrated in FIG. 2, the controller 26 executes actuator control on the basis of the pump pressure state and the actuator pressure state.

Specifically, on the basis of the actuator pressure confirmed in Step S3 illustrated in FIG. 3, the controller 26, in Step S4, specifies a target spool that controls the direction and flow rate of the working fluid to the fluid pressure actuator 4 which is the cause or the main cause of the pump pressure drop.

Further subsequently, in Step S5, the controller 26 throttles the opening of the targeted spool 8 by changing a command value, i.e., a control signal to the solenoid of the electromagnetic valve 23 of the targeted spool 8 which has been specified in Step S4, to increase the actuator pressure of the fluid pressure actuator 4. At this time, in order to make actuation smooth, the spool 8 should be smoothly throttled. For example, the controller 26 sets the command value to the solenoid of the electromagnetic valve 23 so as to throttle the spool 8 taking a predetermined time length not to cause an abrupt change in pressure, so that the actuation of the target fluid pressure actuator 4 does not change abruptly. Currently, the controller 26 remains at a speed reduction to such an extent that would not bring the operator a feeling of great strangeness or stress, although the throttling operation of the spool 8 causes a slight speed sacrifice for the target fluid pressure actuator 4.

After that, the controller 26 confirms the pump pressure on the basis of the output of the pump pressure sensor 28 and determines the pump pressure state.

Specifically, in Step S6, the controller 26 determines whether the pump pressure is equal to or lower than a preset predetermined pressure. The predetermined pressure is a preset required pilot pressure, for example, 4 MPa. This predetermined pressure may be the same as or different from the predetermined pressure used at the time of determination in Step S1. In Step S6, if it is determined that the pump pressure is equal to or higher than the preset predetermined pressure (YES in the flowchart), then in Step S7, the controller 26 determines whether the preset predetermined time length has elapsed. The predetermined time length is set depending on the time length until the accumulator 22 is accumulated again and may be the same as or different from the predetermined time length used at the time of determination in Step S2. In Step S7, if it is determined that the predetermined time length has elapsed (YES in the flowchart), i.e., if it is determined that a state where the pump pressure is equal to or higher than the predetermined pressure has continued for the predetermined time length or longer, the control is terminated. On the other hand, in Step S6, if it is determined that the pump pressure is not equal to or higher than the predetermined pressure (NO in the flowchart), and in Step S7, if it is determined that the predetermined time length has not elapsed (NO in the flowchart), then the process returns to Step S6, respectively.

Figure 4:
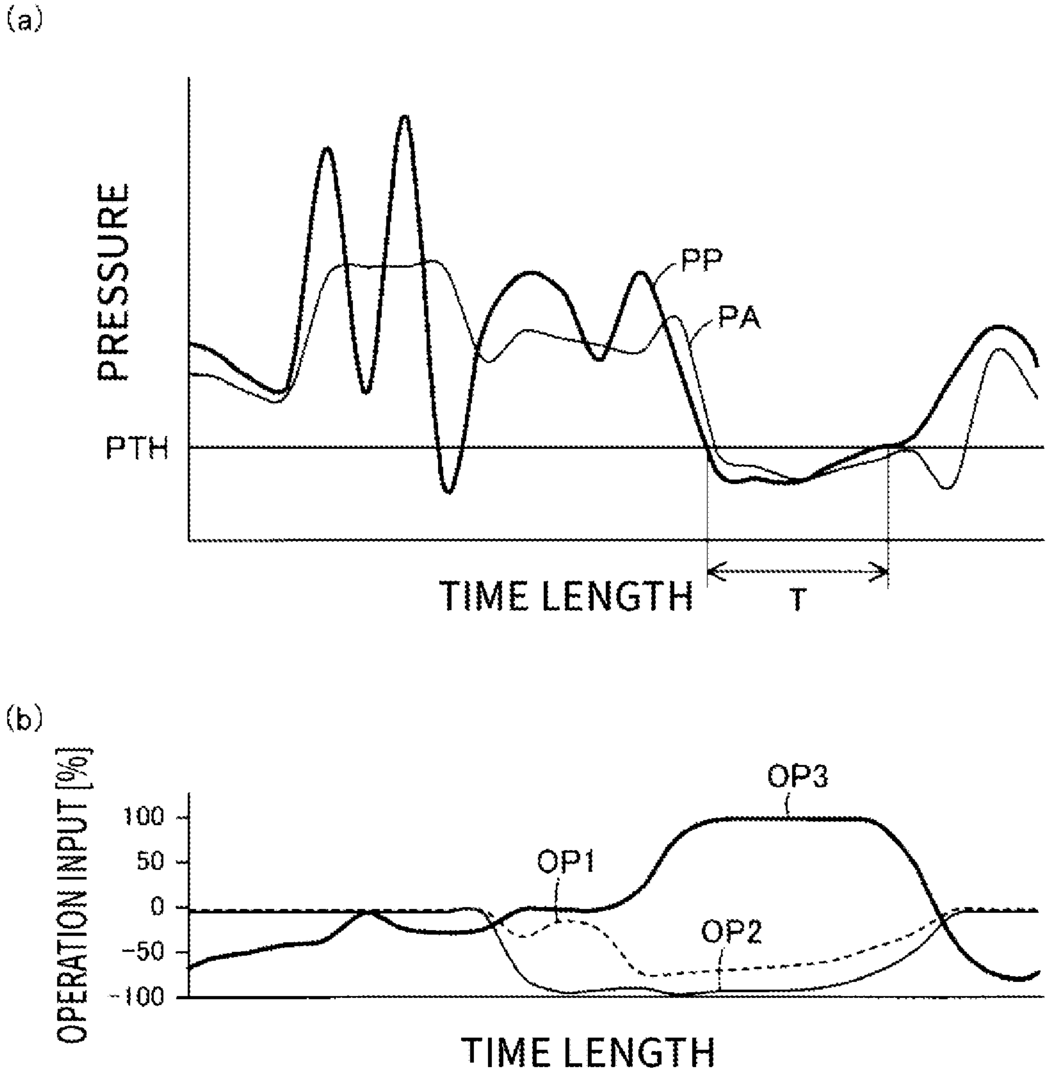
FIG. 4 (*a*) is a graph illustrating an example of change in the pump pressure of the fluid pressure circuit including the pilot pressure control device same as above and the fluid pressure of the actuator.

As an example, with reference to the graphs of FIGS. 4 (*a*) and 4 (*b*), in the working machine, the machine body is traveling in accordance with operation inputs OP1 and OP2 of the left and right traveling pedals (when the operation input is not 0 in FIG. 4 (*b*)). When the operation input OP3 for an arm-out (stick-out) of the working implement is fully input, a rod pressure PA and a pump pressure PP of the fluid pressure actuator 4 abruptly and greatly decrease and reach a predetermined pressure PTH or less. In the present embodiment, when the duration T of such a state becomes a predetermined time length or longer, by throttling the opening of the spool 8 which is the cause thereof, in this example, the spool 8 that controls the direction and flow rate of the working fluid to be supplied to the fluid pressure actuator 4 for operating the arm, the rod pressure PA and the pump pressure PP of the fluid pressure actuator 4 are returned to the predetermined pressure PTH or higher.

That is, according to one embodiment, when the pump pressure drops to the predetermined pressure or below resulting from the drive of the fluid pressure actuator 4, the controller 26 controls so as to throttle the opening of the spool 8 that causes the drop in the pump pressure, thereby enabling the pump pressure to be maintained and the pilot pressure to be secured by the pilot circuit 17 from this pump pressure, without increasing the size of the accumulator 22 for pressure accumulation, i.e., with an inexpensive configuration.

At this time, the controller 26 controls so as to throttle the opening of the spool 8 which is the cause of the decrease in the pump pressure, when a state where the pump pressure is kept at the predetermined pressure or below has continued for the predetermined time length or longer resulting from the drive of the fluid pressure actuator 4, with the result that the controller 26 can be prevented from frequently throttling the opening of the spool 8 in response to a momentary change in pump pressure.

Further, when the opening of the spool 8 is throttled, the actuation of the fluid pressure actuator 4 can be smoothed by throttling smoothly, thereby making it possible not to bring the operator a feeling of great strangeness with the actuation of the fluid pressure actuator 4.

Since the controller 26 specifies the spool 8 that is the cause of the decrease in the pump pressure on the basis of the fluid pressures of the fluid pressure actuators 4 detected by the pressure sensors 29, it becomes possible to control the pump pressure and the pilot pressure accurately, as well to easily detect the spool 8 to be controlled by keeping the pump pressure to be monitored, and the fluid pressure of the fluid pressure actuator 4, so that the adjustment of the control parameters can be simplified.

Further, even if the pump pressure reaches the predetermined pressure or higher, the control is continued for the time length until the pressure is accumulated again in the accumulator 22, so that the pump pressure can be prevented from dropping to the predetermined pressure or lower immediately after the pump pressure reaches the predetermined pressure or higher.

In the above-described embodiment, the controller 26 has controlled so as to throttle the opening of the spool 8 which is the main cause when the pump pressure drops to the predetermined pressure or lower, but in a case where the drives of the plurality of fluid pressure actuators 4 are the causes of the decrease in the pump pressure, not only the opening of one spool 8 which is the main cause is controlled so as to be throttled, but also the opening of at least any of the plurality of spools 8 may be controlled so as to be throttled.

Furthermore, there is adopted the configuration in which the opening amount of the spool 8 can be adjusted by providing the electromagnetic valve 23 for controlling the opening amount of the spool 8, and by allowing the controller 26 to generate a control signal of the electromagnetic valve 23, but without being limited thereto, there may be a configuration in which the opening amount of the spool 8 can be directly adjusted by using the spool 8 itself as an electromagnetic proportional valve, and allowing the controller 26 to generate a control signal of the spool 8.

INDUSTRIAL APPLICABILITY

The present invention has an industrial applicability for business operators engaged in manufacturing, sales businesses, or the like of fluid pressure circuits and working machines provided with the same.

The invention claimed is:

1. A pilot pressure control device configured to control a pilot pressure of a fluid pressure circuit comprising a main circuit configured to control working fluid discharged from a pump by a control valve to drive a fluid pressure actuator; and a pilot circuit configure to supply a pressure which has been controlled so as to depressurize a portion of the working fluid discharged from the pump as a pilot pressure source, the pilot pressure control device comprising a controller configured, when a pump pressure drops to a predetermined pressure or below resulting from the drive of the fluid pressure actuator, to control so as to throttle an opening of a spool that causes the decrease in the pump pressure.

2. The pilot pressure control device according to claim 1, wherein the controller controls, when a state where the pump pressure is kept at the predetermined pressure or below has continued for a predetermined time length or longer resulting from the drive of the fluid pressure actuator, to throttle the opening of the spool that causes the decrease in the pump pressure.

3. The pilot pressure control device according to claim 1, further comprising a pressure sensor configured to detect a fluid pressure of the fluid pressure actuator, wherein the controller is configured to specify the spool that is causing the pump pressure drop, on the basis of the pressure detected by the pressure sensor.

4. The pilot pressure control device according to claim 2, further comprising a pressure sensor configured to detect a fluid pressure of the fluid pressure actuator, wherein the controller is configured to specify the spool that is causing the pump pressure drop, on the basis of the pressure detected by the pressure sensor.

* * * * *